United States Patent [19]

Ishimaru et al.

[11] Patent Number: 4,990,479
[45] Date of Patent: Feb. 5, 1991

[54] PROCESS FOR POLYMERIZING OLEFINS AND POLYMERIZATION CATALYST THEREFOR

[75] Inventors: Naoshi Ishimaru, Yamaguchi; Mamoru Kioka; Akinori Toyota, both of Iwakuni, all of Japan

[73] Assignee: Mitsui Petrochemical Industries, Ltd., Tokyo, Japan

[21] Appl. No.: 366,547

[22] Filed: Jun. 15, 1989

[30] Foreign Application Priority Data

Jun. 17, 1988 [JP] Japan .................. 1-149503
Jan. 24, 1989 [JP] Japan .................. 1-14595
Mar. 2, 1989 [JP] Japan .................. 63-50871

[51] Int. Cl.$^5$ .................................. C08F 4/649
[52] U.S. Cl. .................................. 502/125; 502/123; 502/124; 502/126; 502/127; 526/125; 526/128
[58] Field of Search .............. 502/123, 124, 125, 126, 502/127

[56] References Cited

U.S. PATENT DOCUMENTS

| 4,442,276 | 4/1984 | Kashiwa et al. | 502/125 X |
| 4,659,792 | 4/1987 | Kashiwa et al. | 502/125 X |
| 4,801,672 | 1/1989 | Kohyama et al. | 502/125 X |
| 4,816,433 | 3/1989 | Terano et al. | 502/125 X |

Primary Examiner—Patrick P. Garvin
Attorney, Agent, or Firm—Sherman and Shalloway

[57] ABSTRACT

An olefin polymerization catalyst formed from (A) a solid titanium catalyst component containing magnesium, titanium and halogen as essential ingredients, (B) an organoaluminum compound, and (C) an organosilicon compound containing a cyclopentyl group, a cyclopentenyl group, a cyclopentadienyl group or a derivative derived from any of these groups.

A polymerization process which comprises polymerizing or copolymerizing olefins in the presence of the olefin polymerization catalyst to form a homopolyolefin having a high stereoregularity or a copolyolefin having a narrow composition distribution.

3 Claims, No Drawings

PROCESS FOR POLYMERIZING OLEFINS AND POLYMERIZATION CATALYST THEREFOR

This invention relates to a process for polymerizing an olefin and to a polymerization catalyst. More specifically, it relates to a process for producing a homopolyolefin having high stereoregularity or a copolyolefin having a narrow composition distribution.

Many proposals have already been made on the production of a solid catalyst component consisting essentially of magnesium, titanium, halogen and an electrom donor, and it is known that by using this solid catalyst component in the polymerization of an alpha-olefin having at least 3 carbon atoms, a polymer having high stereoregularity can be produced in high yield.

Many of the solids catalyst components so far proposed have not proved to be entirely satisfactory with regard to such characteristics as catalyst activity and stereoregularity, and still leave room for improvement.

For example, a stereoregular polyolefin produced with such a solid catalyst is generally used without separation of the catalyst after polymerization. If the yield of the polymer per unit amount of the solid catalyst is low, the amount of the remaining catalyst in the polyolefin becomes large and the quality of the polyolefin is degraded.

Furthermore, since the polyolefin containing a large amount of the solid catalyst relatively has a high halogen content, it will cause corrosion of the molding equipment. To prevent corrosion of the molding equipment by the remaining halogen, the solid catalyst desirably has a high yield per unit amount of the solid catalyst.

To meet such a requirement, the present applicants have proposed catalysts formed from (A) a highly active titanium catalyst component consisting essentially of magnesium, titanium, halogen and an electron donor, (B) an organometallic compound and (C) a certain organosilicon compound catalyst component, and processes for polymerizing or copolymerizing olefins in the presence of these catalysts (see Japanese Laid-Open Patent Publications Nos. 83006/1983, 138705/1983, 138706/1983, 138707/1983, 138708/1983, 138709/1983, 138710/1983 and 138715/1983).

The above catalysts show high catalytic activity, and can give polymers having excellent stereoregularity. However, the development of catalysts showing higher catalytic activity is by no means undesirable.

On the other hand, because of its excellent physical properties, polypropylene finds extensive use in a wide range of fields, for example in the field of packaging films. In this use, it is general practice to offer it as a propylene/ethyene copolymer having an ethylene content of about 1 to 5 % by weight for increased heat-sealability at low temperatures. Films of such a modified polypropylene have the advantage of possessing better transparency or scratch resistance than films of low-density polyethylene used as packaging films, but have inferior heat-sealability at low temperature. To increase heat sealability further, it is known to further increase the amount of ethylene copolymerized. In this case, however, the proportion of a soluble copolymer of no use value increases, and the yield of the desired copolymer is lowered. Moreover, in slurry polymerization, the properties of the slurry during polymerization are degraded, and the polymerization becomes difficult in some cases.

To circumvent these problems, Japanese Laid-Open Patent Publications Nos. 35487/1974, 79195/1976 and 16588/1977 propose a process for copolymerizing propylene with ethylene and an alpha-olefin having at least 4 carbon atoms by using a conventional titanium trichloridetype catalyst. In this process, the proportion of a solvent-soluble polymer decreases as compared with the case of copolymerizing propylene and ethylene. However, when it is compared with the case of homopolymerizing propylene, the proportion of a solvent-soluble polymer formed is large, and this tendency becomes greater as the amount of ethylene or the alpha-olefin having at least 4 carbon atom increases.

The present inventors found that when a supported catalyst formed from a solid titanium catalyst component, an organometallic compound catalyst component and an electron donor catalyst component is used in the copolymerization of propylene, ethylene and an alpha-olefin having at least 4 carbon atoms, the proportion of the soluble polymer can be further decreased, and better results can be obtained in the yield of the desired copolymer and in catalyst efficiency. This technique was proposed in Japanese Laid-Open Patent Publication No. 26891/1979. A marked improvement was observed by the use of the catalyst disclosed specifically in this patent document. However, when it is desired to produce a copolymer having a fairly high content of ethylene, a porridge-like copolymer forms to degrade the properties of the slurry, and it becomes difficult to continue the polymerization. As a result, a solid polymer cannot be obtained in a sufficiently high yield. If the ethylene content cannot be increased in the production of a copolymer having a low melting point, there will be no choice but to increase the content of the alpha-olefin having at least 4 carbon atoms. However, since the alpha-olefin has a less effect of lowering the melting point of the polymer, and the rate of copolymerization is slower, it is not wise to adopt a method of increasing the content of the alpha-olefin having at least 4 carbon atoms to an extent more than necessary.

The present inventors further proposed in Japanese Laid-Open Patent Publication No. 47210/1984 a process by which a copolymer of propylene, ethylene and an alpha-olefin having at least 4 carbon atoms, which has a narrow composition distribution and excellent heat sealability suitable for film application, can be obtained in a large amount and a high yield while reducing the undesirable formation of the by-product soluble copolymer. The copolymer obtained by this method, however, does not have sufficient heat-sealability, heat-seal imparting property, transparency and antiblocking property, and its hydrocarbon-soluble content is not so small as to be sufficiently satisfactory.

Propylene copolymers obtained by block copolymerization instead of random copolymerization are also known. These block propylene copolymers are much used in containers, automotive parts, low-temperature heat sealable films, and high impact films.

Generally, the impact strength of the above block copolymers can be effectively improved by increasing the proportion of a rubbery copolymer. However, this frequently entails troubles such as the increasing tendency of polymer particles to become sticky, the adhesion of the polymer particles to the inside wall of the equipment, and the difficulty of performing the operation stably and continuously for an extended period of time. Particularly in a gaseous phase polymerization, the degraded flowability of the polymer particles caused by their increased sticking tendency becomes a fatal defect in operation. Furthermore, in the slurry polymerization, too, the amount of a solvent-soluble polymer increases and the viscosity of the slurry increases unduly to make the polymerization operation difficult. In addition, the amount of a rubbery polymer taken into the solid polymer does not increase to a desired extent. Polymer particles obtained by such a polymerization conducted in an unsatisfactory state have a low bulk density and poor flowability, and involve many defects in after-treatment operations such as conveying or melt-processing.

It is an object of this invention, therefore, to provide a novel polymerization catalyst having high polymerization activity and being capable of giving a homopolyolefin having excellent stereoregularity or a copolyolefin having a narrow composition distribution, and a polymeriation process using this catalyst.

Another object of this invention is to provide an olefin polymerization catalyst which does not easily decrease in polymerization activity with time and can give polyolefin particles being excellent in particle size distribution, particle size, particle shape and bulk density, and a process for polymerizing olefins by using this catalyst.

Still another object of this invention is to provide an olefin polymerization catalyst which does not decrease in polymerization activity even when it is used in the presence of a molecular-weight controlling agent such as hydrogen in the polymerization of an olefin to produce a polymer having a controlled melt flow rate, and a process for polymerizing olefins by using this catalyst.

Yet another object of this invention is to provide an olefin polymerization catalyst capable of giving an olefin polymer having a lesser amount of a hydrocarbon-soluble component and a narrower composition distribution than polymers obtained by using conventional catalysts, and a process for polymerizing olefins by using this catalyst.

A further object of this invention is to provide an olefin polymerization catalyst which gives a propylene copolyer such as a propylene random copolymer having excellent heatsealability, heat-seal imparting property, transparency and antiblocking propery and contains a less hydrocarbon-soluble component, and a polymerization process using this catalyst.

A still further object of this invention is to provide a catalyst for production of a propylene block copolymer having excellent rigidity, impact strength, flowability and low-temperature heat sealability with good operability, and a polymerization process.

Other objects of this invention along with its advantages will become apparent from the following description.

These objects and advantages are achieved in accordance with this invention by an olefin polymerization catalyst formed from (A) a solid titanium catalyst component containing magnesium, titanium and halogen as essential ingredients,
(B) an organoaluminum compound, and
(C) an organosilicon compound containing a cyclopentyl group, a cyclopentenyl group, a cyclopentadienyl group or a derivative derived from any of these groups; and a polymerization process which comprises polymerizing or copolymerizing olefins in the presence of the polymerization catalyst described above.

The catalyst according to this invention is formed from (A) a solid titanium catalyst component, (B) an organoaluminum compound, and (C) a specific organosilicon compound.

The solid titanium catalyst component (A) used in this invention is a highly active catalyst component at least comprising magnesium, titanium and halogen. Particularly, a solid titanium catalyst component containing magnesium, titanium, halogen and an electron donor is preferred because it has high activity and gives a polymer having high stereoregularity.

The solid titanium catalyst component (A) may be prepared by contacting a magnesium compound and a titanium compound to be described.

The titanium compound used in the preparation of the solid titanium catalyst component (A) in the present invention may be, for example, a tetravalent titanium compound represented by the formula $Ti(OR)_gX_{4-g}$ wherein R represents a hydrocarbon group, preferably an alkyl group having 1 to 4 carbon atoms, X represents a halogen atom, and $0 \leq g \leq 4$. Specific examples of the titanium compound include titanium tetrahalides such as $TiCl_4$, $TiBr_4$ and $TiI_4$; alkoxytitanium trihalides such as $Ti(OCH_3)Cl_3$, $Ti(OC_2H_5)Cl_3$, $Ti(On-C_4H_9)Cl_3$, $Ti(OC_2H_5)Br_3$ and $Ti(O\ iso-C_4H_9)Br_3$; dialkoxytitanium dihalides such as $Ti(OCH_3)_2Cl_2$, $Ti(OC_2H_5)_2Cl_2$, $Ti(O\ n-C_4H_9)_2Cl_2$ and $Ti(OC_2H_5)_2Br_2$; trialkoxytitanium monohalides such as $Ti(OCH_3)_3Cl$, $Ti(OC_2H_5)_3Cl$, $Ti(O\ n-C_4H_9)_3Cl$ and $Ti(OC_2H_5)_3Br$; and tetraalkoxytitaniums such as $Ti(OCH_3)_4$, $Ti(OC_2H_5)_4$ and $Ti(O\ n-C_4H_9)_4$.

Among these, the halogen-containing titanium compounds, especially titanium tetrahalides, are preferred. These titanium compounds may be used singly or in a combination of two or more. They may be used as dilutions in hydrocarbon compounds or halogenated hydrocarbons.

The magnesium compounds used in the preparation of the solid titanium catalyst component may be, for example, a magnesium compound having reducibility and a magnesium having no reducibility.

The magnesium compound having reducibility may be, for example, a magnesium compound having a magnesium-carbon bond or a magnesium-hydrogen bond. Specific examples of the magnesium compound having reducibility include dialkyl magnesiums such as dimethyl magnesium, diethyl magnesium, dipropyl magnesium, dibutyl magnesium, ethylbutyl magnesium, diamyl magnesium, dihexyl magnesium and didecyl magnesium; monoalkyl magnesium monohalides such as ethyl magnesium chloride, propyl magnesium chloride, butyl magnesium chloride, hexyl magnesium chloride and amyl magnesium chloride; butylethoxymagnesium; and butyl magnesium halides. These magnesium compounds may be used as such or as a complex with an organoaluminum compound to be described. These magnesium compound may be liquid or solid.

Specific examples of the magnesium compound having no reducibility include magnesium halides such as magnesium chloride, magnesium bromide, magnesium iodide and magnesium fluoride; alkoxy magnesium halides such as methoxy magnesium chloride, ethoxy magnesium chloride, isopropoxy magnesium chloride, butoxy magnesium chloride and octoxy magnesium chloride; aryloxy magnesium halides such as phenoxy magnesium chloride and methylphenoxy magnesium chloride; alkoxy magnesiums such as ethoxy magnesium, isopropoxy magnesium, butoxy magnesium, n-octoxy magnesium and 2-ethylhexoxy magnesium; aryloxy magnesiums such as phenoxy magnesium and dimethylphenoxy magnesium; and carboxylic acid salts of magnesium such as magnesium laurate and magnesium stearate.

The magnesium compound having no reducibility may be a compound derived from the magnesium compound having reducibility separately or at the time of preparing the catalyst component. This may be effected, for example, by contacting the magnesium compound having reduciblity with such a compound as a polysiloxane compound, a halogen-containing silane compound, a halogen-containing aluminum compound, an ester or an alcohol. In addition to the above magnesium compounds having reducibility and those having no reducibility, the magnesium compound used in this invention may also be a complex compound or a double compound with another metal or a mixture with another metal compound.

In the present invention, the magnesium compounds having no reducibility are preferred, and halogen-containing magnesium compounds are especially preferred. Above all, magnesium chloride, alkoxy magnesium chlorides and aryloxy magnesium chlorides are preferred.

In the preparation of the solid titanium catalyst component (A) in this invention, it is preferred to use an electron donor, for example, oxygen-containing electron donors such as alcohols, phenols, ketones, aldehydes, carboxylic acids, organic or inorganic acid esters, ethers, acid amides and acid anhydrides, and nitrogen-containing electron donors such as ammonia, amines, nitriles and isocyanates. Specific examples include alcohols having 1 to 18 carbon atoms which may have an alkyl group such as methanol, ethanol, propanol, pentanol, hexanol, octanol, 2-ethylhexanol, dodecanol, octadecyl alcohol, benzyl alcohol, phenylethyl alcohol, cumyl alcohol and isoplropylbenzyl alcohol; phenols having 6 to 25 carbon atoms such as phenol, resol, xylenol, ethylphenol, propylphenol, cumylphenol, nonylphenol and naphthol; ketones having 3 to 15 carbon atoms such as acetone, methyl ethyl ketone, methyl isobutyl ketone, acetophenone and benzophenone; aldehydes having 2 to 15 carbon atoms such as acetaldehyde, propionaldehyde, octylaldehyde, benzaldehyde, tolualdehyde and naphthaldehyde; organic acid esters having 2 to 30 carbon atoms such as methyl formate, ethyl acetate, vinyl acetate, propyl acetate, octyl acetate, cyclohexyl acetate, ethyl propionate, methyl butyrate, ethyl valerate, ethyl stearate, methyl chloroacetate, ethyl dichloroacetate, methyl methacrylate, ethyl crotonate, dibutyl maleate, diethyl butylmalonate, diethyl dibutylmalonate, ethyl cyclohexanecarboxylate, diethyl 1,2-cyclohexanedicarboxylate, di-2-ethylhexyl 1,2-cyclohexanedicarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, dimethyl phthalate, diethyl phthalate, dibutyl phthalate, dioctyl phthalate, gammabutyrolactone, delta-valerolactone, coumarine, phthalide and ethylene carbonate; inorganic acid esters such as ethyl silicate, butyl silicate, vinyltriethoxysilane, phenyltriethoxysilane and diphenyldiethoxysilane; acid halides having 2 to 15 carbon atoms such as acetyl chloride, benzoyl chloride, tolyl chloride, anisoyl chloride and phthaloyl dichloride; ethers having 2 to 20 carbon atoms such as methyl ether, ethyl ether, isopropyl ether, butyl ether, amyl ether, tetrahydrofuran, anisole and diphenyl ether; acid amides such as acetamide, benzamide and toluamide; acid anhydrides such as benzoic anhydride and phthalic anhydride, amines such as methylamine, ethylamine, diethylamine, tributylamine, piperidine, tribenzylamine, aniline, pyridine, picoline and tetramethylethylenediamine; and nitriles such as acetonitrile, benzonitrile and tolunitrile.

An organosilicon compound represented by the following formula (I)

$$R_n Si(OCR')_{4-n} \quad (I)$$

wherein R and R' represent a hydrocarbon group, and n is $0 \leq n \leq 4$. may also be used as the electron donor.

Specific examples of the organosilicon compound of general formula (I) include trimethylmethoxysilane, trimethylethoxysilane, dimethyldimethoxysilane, dimethyldiethoxysilane, diisopropyldimethoxysilane, t-butylmethyldimethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldiethoxysilane, bisethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, gamma-chloropropyltrimethoxysilane, methyltriethoxysilane, ethyltriethoxysilane, vinyltriethoxysilane, t-butyltriethoxysilane, n-butyltriethoxysilane, iso-butyltriethoxysilane, phenyltriethoxysilane, gamma-aminopropyltriethoxysilane, chlorotriethoxysilane, ethyltriisopropoxysilane, vinyltributoxysilane, cyclohexyltrimethoxysilane, cyclohexyltriethoxysilane, 2-norbornanetrimethoxysilane, 2-norbornanetriethoxysilane, 2-norbornanemethyldimethoxysilane, ethyl silicate, butyl silicate, trimethylphenoxysilane, methyltriallyloxysilane, vinyltris(beta-methoxyethoxysilane), vinyltriacetoxysilane, and dimethyltetraethoxydisiloxane.

Among these organosilane compounds preferred are ethyltriethoxysilane, n-propyltriethoxysilane, t-butyltriethoxysilane, vinyltriethoxysilane, phenyltriethoxysilane, vinyltributoxysilane, diphenyldimethoxysilane, phenylmethyldimethoxysilane, bis-p-tolyldimethoxysilane, p-tolylmethyldimethoxysilane, dicyclohexyldimethoxysilane, cyclohexylmethyldimethoxysilane, 2-norbornanetriethoxysilane, 2-norbornanemethyldimethoxysilane and diphenyldiethoxysilane.

Organosilicon compounds having a cyclopentyl group, a cyclopentenyl group, a cyclopentadienyl group, or a derivative of any of these groups may also be used. Examples include those of formula (II) given hereinafter.

These electron donors may be used singly or in combination.

Esters are the electron donors which are desired to be included in the titanium catalyst component. Examples of these esters are compounds represented by the following formulae

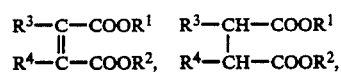

-continued

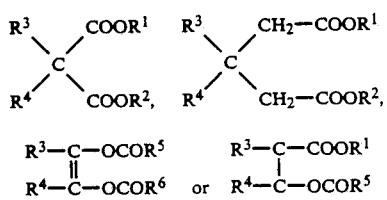

wherein R¹ represents a substituted or unsubstituted hydrocarbon group, and R², R⁵ and R⁶ represent a hydrogen atom or a substituted or unsubstituted hydrocarbon group, R³ and R⁴ represent a hydrogen atom or a substituted or unsubstituted hydrocarbon group, at least one of them is preferably a substituted or unsubstituted hydrocarbon group, and R³ and R⁴ may be linked to each other.

Examples of the substituted hydrocarbon groups for R¹ through R⁵ are hydrocarbon groups having groups containing hetero atoms such as N, O and S, for example, C—O—C, COOR, COOH, OH, SO₃H, —C—N—C— and NH₂.

Especially preferred are diesters of dicarboxylic acids in which at least one of R¹ and R² is an alkyl group having at least 2 carbon atoms.

Specific examples of polycarboxylic acid esters include aliphatic polycarboxylic acid esters such as diethyl succinate, dibutyl succinate, diethyl methylsuccinate, diisobutyl alpha-methylglutarate, dibutyl malonate, diethyl methylmalonate, diethyl ethylmalonate, diethyl isopropylmalonate, diethyl butyl malonate, diethyl phenylmalonate, diethyl diethylmalonate, diethyl allylmalonate, diethyl diisobutylmalonate, diethyl di-n-butylmalonate, dimethyl maleate, monooctyl maleate, dioctyl maleate, dibutyl maleate, dibutyl butylmaleate, diethyl butylmaleate, diisopropyl beta-methylglutarate, diallyl ethylsuccinate, di-2-ethylhexyl fumarate, diethyl itaconate, dibutyl itaconate, dioctyl citraconate and dimethyl citraconate; alicyclic polycarboxylic acid esters such as diethyl 1,2-cyclohexanecarboxylate, diisobutyl 1,2-cyclohexanecarboxylate, diethyl tetrahydrophthalate and Nadic acid, diethyl ester; aromatic polycarboxylic acid esters such as monoethyl phthalate, dimethyl phthalate, methylethyl phthalate, monoisobutyl phthalate, mono-n-butyl phthalate, diethyl phthalate, ethylisobutyl phthalate, ethyl-n-butyl phthalate, di-n-propyl phthalate, diisopropyl phthalate, di-n-butyl phthalate, diisobutyl phthalate, di-n-heptyl phthlate, di-2-ethylhexyl phthalate, di-n-octyl phthalate, dineopentyl phthalate, didecyl phthalate, benzylbutyl phthalate, diphenyl phthalate, diethyl naphthalenedicarboxylate, dibutyl naphthlenedicarboxylate, triethyl trimelliatate and dibutyl trimellitate; and heterocyclic polycarboxylic acid esters such as 3,4-furanedicarboxylic acid esters.

Specific examples of the polyhydroxy compound esters may include 1,2-diacetoxybenzene, 1-methyl-2,3-diacetoxybenzene, 2-methyl-2,3-diacetoxybenzene, 2,8-diacetoxynaphthalene, ethylene glycol dipivalate and butanediol pivalate.

Specific examples of the hydroxy-substituted carboxylic acid esters are benzoylethyl salicylate, acetylisobutyl salicylate and acetylmethyl salicylate.

Long-chain dicarboxylic acid esters, such as diethyl adipate, diisobutyl adipate, diisopropyl sebacate, di-n-butyl sebacate, di-n-octyl sebacate and di-2-ethylhexyl sebacate, may also be used as the polycarboxylic acid esters that can be included in the titanium catalyst component.

Among these polyfunctional esters, compounds having the skeletons given by the above general formulae are preferred. More preferred are esters formed between phthalic acid, maleic acid or substituted malonic acid and alcohols having at least 2 carbon atoms, diesters formed between phthalic acid and alcohols having at least 2 carbon atoms are especially preferred.

Another group of electron donors that can be included in the titanium catalyst component are monocarboxylic acid esters represented by RCOOR' where R and R' are hydrocarboyl groups that may have a substituent, and at least one of them is a branched (including alicyclic) or ring-containing aliphatic group. Specifically, at least one of R and R' may be (CH₃)₂CH—, C₂H₅CH(CH₃)—, (CH₃)₂CHCH₂—, (CH₃)₃C—, C₂H₅CH, (CH₃)CH₂—,

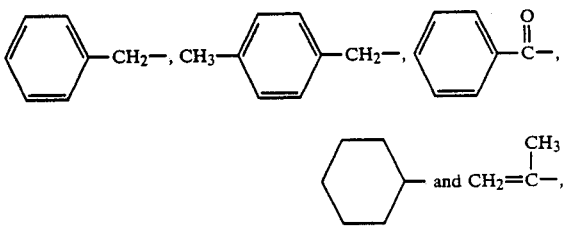

If either one of R and R' is any of the above-described group, the other may be the above group or another group such as a linear or cyclic group.

Specific examples of the monocarboxylic acid esters include monoesters of dimethylacetic acid, trimethylacetic acid, alpha-methylbutyric acid, betamethylbutyric acid, methacrylic acid and benzoylacetic acid; and monocarboxylic acid esters formed with alcohols such as isopropanol, isobutanol and tert-butanol.

Carbonic acid esters may also be used as the electron donor. Specific examples are diethyl carbonate, ethylene carbonate, diisopropyl carbonate, phenylethyl carbonate and diphenyl carbonate.

In depositing the electron donor, they do not have to be used directly as starting materials, but compounds convertible to the electron donors in the course of preparing the titanum catalyst components may also be used as the starting materials.

Another electron donor may be present in the titanium catalyst component, but its amount should be limited to a small one since too much of it will exert adverse effects.

In the present invention, the solid titanium catalyst component (A) may be produced by contacting the magnesium compound (or metallic magnesium) and the titanium compound and preferably, the electron donor by known methods used to prepare a highly active titanium catalyst component from a magnesium compound, a titanium compound and an electron donor. The above compounds may be contacted in the presence of another reaction agent such as silicon, phosphorus or aluminum.

Several examples of the method of producing the solid titanium catalyst component (A) will be briefly described below.

(1) The magnesium compound or the complex of the magnesium compound with the electron donor, is reacted with the titanium compound in the liquid phase.

This reaction may be carried out in the presence of a pulverizing agent. Compounds which are solid may be pulverized before the reaction.

(2) The magnesium compound having no reducibility and the titanium compounds, both in liquid form, are reacted in the presence of the electron donor to precipitate a solid titanium complex.

(3) The reaction product obtained in (2) is further reacted with the titanium compound.

(4) The reaction product obtained in (1) or (2) is further reacted with the electron donor and the titanium compound.

(5) The magnesium compound or a complex of the magnesium compound and the electron donor is pulverized in the presence of the titanium compound, and the resulting solid product is treated with a halogen, a halogen compound or an aromatic hydrocarbon. In this method, the magnesium compound or the complex of it with the electron donor may be pulverized in the presence of a pulverizing agent, etc. Alternatively, the magnesium compound or the complex of the magnesium compound and the electron donor is pulverized in the presence of the titanium compound, preliminarily treated with a reaction aid and thereafter, treated with halogen, etc. The reaction aid may be an organoaluminum compound or a halogen-containing silicon compound.

(6) The product obtained in (1) to (4) is treated with a halogen, a halogen compound or an aromatic hydrocarbon.

(7) A product obtained by contacting a metal oxide, dihydrocarbyl magnesium and a halogen-containing alcohol is contacted with the electron donor and the titanium compound.

(8) A magnesium compound such as a magnesium salt of an organic acid, an alkoxy magnesium or an aryloxy magnesium is reacted with the electron donor, the titanium compound and/or a halogen-containing hydrocarbon.

Among the methods (1) to (8) cited above for the preparation of the solid titanium catalyst component (a), the method in which the liquid titanium halide is used at the time of catalyst preparation, and the method in which the halogenated hydrocarbon is used after, or during, the use of the titanium compound are preferred.

The amounts of the ingredients used in preparing the solid titanium catalyst component (A) may vary depending upon the method of preparation. For example, about 0.01 to 5 moles, preferably 0.05 to 2 moles, of the electron donor and about 0.01 to 500 moles, preferably about 0.05 to 300 moles, of the titanium compound are used per mole of the magnesium compound.

The solid titanium catalyst component so obtained contains magnesium, titanium, halogen and the electron donor as essential ingredients.

In the solid titanium catalyst component (A), the atomic ratio of halogen/titanium is about 4-200, preferably about 5-100; the electron donor/titanium mole ratio is about 0.1-10, preferably about 0.2-6; and the magnesium/titanium atomic ratio is about 1-100, preferably about 2-50.

The resulting solid titanium catalyst component (A) contains a magnesium halide of a smaller crystal size than commercial magnesium halides and usually has a specific surface area of at least about 50 m²/g, preferably about 60 to 1,000 m²/g, more preferably about 100 to 800 m²/g. Since, the above ingredients are unified to form an integral structure of the solid titanium catalyst component (A), the composition of the solid titanium catalyst component (a) does not substantially change by washing with hexane.

The solid titanium catalyst component (A) may be used alone. If desired, it can be used after being diluted with an inorganic or organic compound such as a silicon compound, an aluminum compound or a polyolefin. When such a diluent is used, the catalyst component (A) show high catalytic activity even when it has a lower specific surface than that described above.

Methods of preparing the highly active catalyst component, which can be used in this invention, are described in Japanese Patent Publications Nos. 108385/1975, 126590/1975, 20297/1976, 28189/1976, 64586/1976, 92885/1976, 136625/1976, 87489/1977, 100596/1977, 147688/1977, 104593/1977, 2580/1978, 40093/1978, 40094/1978, 43094/1978, 135102/1980, 135103/1980, 152710/1980, 11908/1981, 18606/1981, 83006/1983, 138705/1977, 138706/1983, 138707/1983, 138708/1983, 138709/1983, 138710/1983, 138715/1983, 23404/1985, 21109/1986, 37802/1986 and 37803/1986.

Compounds having at least one aluminum-carbon bond in the molecule can be used as the organoaluminum compound as catalyst component (B). Examples are compounds of the following general formula (i) and (ii).

(i) Organoaluminum compounds of the general formula $$R_m^{11} Al(OR^{12})_n H_p X_q^1$$

In the general formula, $R^{11}$ and $R^{12}$ may be identical or different, and each represent a hydrocarbon group usually having 1 to 15 carbon atoms, preferably 1 to 4 carbon atoms; $X^1$ represents a halogen atom, $0 < m \leq 3$, $0 \leq n < 3$, $0 \leq p < 3$, $0 \leq q < 3$, and $m+n+p+q=3$.

(ii) Complex alkylated compounds between aluminum and a metal of Group I represented by the general formula $M^1 AlR_4^{11}$ wherein $M^1$ represents Li, Na or K, and $R^{11}$ is as defined above.

Examples of the organoaluminum compounds of general formula (i) are as follows:

Compounds of the general formula $R_m^{11} Al(OR^{12})_{3-m}$ wherein $R^{11}$ and $R^{12}$ are as defined, and m is preferably a number represented by $1.5 \leq m \leq 3$.

Compounds of the general formula $R_m^{11} AlX_{3-m}^1$ wherein $R^{11}$ is as defined, $X^1$ is halogen, and m is preferably a number represented by $0 < m < 3$.

Compounds of the general formula $R_m^{11} AlH_{3-m}$ wherein $R^{11}$ is as defined above, and m is preferably a number represented by $2 \leq m < 3$.

Compounds represented by the general formula $R_m^{11} Al(OR^{12})_n X_q^1$ wherein $R^{11}$ and $R^{12}$ are as defined, $X^1$ is halogen, $0 < m \leq 3$, $0 \leq n < 3$, $0 \leq q < 3$, and $m+n+q=3$.

Specific examples of the organoaluminum compounds belonging to (i) include trialkyl aluminums such as triethyl aluminum and tributyl aluminum; trialkenyl aluminums such as triisoprenyl aluminum; dialkyl aluminum alkoxides such as diethyl aluminum ethoxide and dibutyl aluminum butoxide; alkyl aluminum sesquialkoxides such as ethyl aluminum sesquiethoxide and butyl aluminum sesquibutoxide; partially alkoxylated alkyl aluminums having an average composition represented by $R_{2.5}^{11} Al(OR^{12})_{0.5}$; dialkyl aluminum halides such as diethyl aluminum chloride, dibutyl aluminum chloride and diethyl aluminum bromide; alkyl aluminum sesquihalides such as ethyl aluminum sesquichloride, butyl aluminum sesquichloride and ethyl aluminum sesquibromide; partially halogenated alkyl aluminums, for example alkyl aluminum dihalides such as ethyl aluminum dichloride, propyl aluminum dichloride and butyl aluminum dibromide; dialkyl aluminum hydrides such as diethyl aluminum hydride and dibutyl aluminum hydride; other partially hydrogenated alkyl aluminum, for example alkyl aluminum dihyrides such as ethyl aluminum dihydride and propyl aluminum dihydride; and partially alkoxylated and halogenated alkyl aluminums such as ethyl aluminum ethoxychloride, butyl aluminum butoxychloride and ethyl aluminum ethoxybromide.

Organoaluminum compounds similar to (i) in which two or more aluminum atoms are bonded via an oxygen or nitrogen atom. Examples are $(C_2H_5)_2AlOAl(C_2H_5)_2$, $(C_4H_9)_2AlOAl(C_4H_9)_2$, $(C_2H_5)_2AlNAl(C_2H_5)_2$ $C_2H_5$ and methylaluminoxane.

Examples of the compounds belonging to (ii) are $LiAl(C_2H_5)_4$ and $LiAl(C_7H_{15})_4$.

Among these, the trialkyl aluminums and the alkyl aluminums resulting from bonding of the two or more of the above aluminum compounds are preferred.

Catalyst component (C) is an organosilicon compound containing in its structure a cyclopentyl group, a cyclopentenyl group, a cyclopentadienyl group, or a derivative of any one of these groups may be used. Prefer red organosilicon compounds are those of the following general formula (II).

$$SiR^{21}R_m^{22}(OR^{23})_{3-m} \quad (II)$$

In the above formula (II), $0 \leq m < 3$, preferably $0 \leq m \leq 2$, especially preferably $m=2$; and $R^{21}$ represents a cyclopentyl group, a cyclopentenyl group, a cyclopentadienyl group or a derivative of any of these. The derivative may preferably be, for example, a cyclopentyl group substituted by 1 to 4 alkyl groups having 1 to 4 carbon atoms, an alkyl group having 2 to 4 carbon atoms substituted by a cyclopentyl group which may be substituted by to 4 alkyl groups having 1 to 4 carbon atoms, a cyclopentenyl group substituted by 1 to 4 alkyl groups having to 4 carbon atoms, a cyclopentadienyl group substituted by 1 to 4 alkyl groups having 1 to 4 carbon atoms, or an indenyl, indanyl, tetrahydroindenyl or fluorenyl group which may be substituted by 1 to 4 alkyl groups having 1 to 4 carbon atoms.

Specific examples of the group $R^{21}$ include
cyclopentyl,
2-methylcyclopentyl,
3-methylcyclopentyl,
2-ethylcyclopentyl,
3-propylcyclopentyl,
3-isopropylcyclopentyl,
3-butylcyclopentyl,
3-tertiary butyl cyclopentyl,
2,2-dimethylcyclopentyl,
2,3-dimethylcyclopentyl,
2,5-dimethylcyclopentyl,
2,2,5-trimethylcyclopentyl,
2,3,4,5-tetramethylcyclopentyl,
2,2,5,5-tetramethylcyclopentyl,
1-cyclopentylpropyl,
1-methyl-1-cyclopentylethyl,
cyclopentenyl,
2-cyclopentenyl,
3-cyclopentenyl,
2-methyl-1-cyclopentenyl,
2-methyl-3-cyclopentenyl,
3-methyl-3-cyclopentenyl,
2-ethyl-3-cyclopentenyl,
2,2-dimethyl-3-cyclopentenyl,
2,5-dimethyl-3-cyclopentenyl,
2,3,4,5-tetramethyl-3-cyclopentenyl,,
2,2,5,5-tetramethyl-3-cyclopentenyl,
1,3-cyclopentadienyl,
2,4-cyclopentadienyl,
1,4-cyclopentadienyl,
2-methyl-1,3-cyclopentadienyl,
2-methyl-2,4-cyclopentadienyl,
3-methyl-2,4-cyclopentadienyl,
2-ethyl-2,4-cyclopentadienyl,
2,2-dimethyl-2,4-cyclopentadienyl,
2,3-dimethyl-2,4-cyclopentadienyl,
2,5-dimethyl-2,4-cyclopentadienyl,
2,3,4,5-tetramethyl-2,4-cyclopentadienyl,
indenyl,
2-methylindenyl,
2-ethylindenyl,
2-indenyl,
1-methyl-2-indenyl,
1,3-dimethyl-2-indenyl,
indanyl,
2-methylindanyl,
2-indanyl,
1,3-dimethyl-2-indanyl,
4,5,6,7-tetrahydroindenyl,
4,5,6,7-tetrahydro-2-indenyl,
4,5,6,7-tetrahydro-1-methyl-2-indenyl,
4,5,6,7-tetrahydro-1,3-dimethyl-2-indenyl, and
fluorenyl groups.

In formula (II), $R^{22}$ and $R^{23}$ are identical or different and each represents a hydrocarbon. Examples of $R^{22}$ and $R^{23}$ are alkyl, cycloalkyl, aryl and aralkyl groups.

Furthermore, $R^{21}$ and $R^{22}$ may be bridged by an alkyl group, etc.

Especially preferred organosilicon compounds are those of formula (II) in which $R^{21}$ is a cyclopentyl group, $R^{22}$ is an alkyl group or a cyclopentyl group, and $R^{23}$ is an alkylgroup, particularly a methyl or ethyl group.

Specific examples of the organosilicon compounds of formula (II) include
trialkoxysilanes such as cyclopentyltrimethoxysilane, 2-methylcyclopentyltrimethoxysilane, 2,3-dimethylcyclopentyltrimethoxysilane, 2,5-dimethylcyclopentyltrimethoxysilane, cyclopentyltriethoxysilane, cyclopentenyltrimethoxysilane, 3-cyclopentenyltrimethoxysilane, 2,4-cyclopentadienyltrimethoxysilane, indenyltrimethoxysilane and fluorenyltrimethoxysilane;
dialkoxysilanes such as dicyclopentyldimethoxysilane, bis(2-methylcyclopentyl)dimethoxysilane, bis(3-tertiary butylcyclopentyl)dimethoxysilane, bis(2,3-dimethylcyclopentyl)dimethoxysilane, bis(2,5-dimethylcyclopentyl)dimethoxysilane, dicyclopentyldiethoxysilane, dicyclopentenyldimethoxysilane, di(3-cyclopentenyl)-dimethoxysilane, bis(2,5-dimethyl-3-cyclopentenyl)-dimethoxysilane, di-2,4-cyclopentadienyldimethoxysilane, bis(2,5-dimethyl-2,4-cyclopentadienyl)dimethoxysilane, bis(1-methyl-1-cyclopentylethyl)dimethoxysilane, cyclopentylcyclopentenyldimethoxysilane, cyclopentylcyclopentadienyldimethoxysilane, diindenyldimethoxysilane, bis(1,3-dimethyl-2-indenyl)dimethoxysilane, cyclopentadienylindenyldimethoxysilane, difluorenyldimethoxysilane, cyclopentylfluorenyldimethoxysilane and indenylfluorenyldimethoxysilane;

monoalkoxysilanes such as tricyclopentylmethoxysilane, tricyclopentenylmethoxysilane, tricyclopentadienylmethoxysilane, tricyclopentylethoxysilane, dicyclopentylmethylmethoxysilane, dicyclopentylethylmethoxysilane, dicyclopentylmethylethoxysilane, cyclopentyldimethylmethoxysilane, cyclopentyldiethylmethoxysilane, cyclopentyldimethylethoxysilane, bis(2,5-dimethylcyclopentyl)cyclopentylmethoxysilane, dicyclopentylcyclopentenylmethoxysilane, dicyclopentylcyclopentadienylmethoxysilane and diindenylcyclopentylmethoxysilane; and ethylenebis-cyclopentyldimethoxysilane.

In the polymerization process of this invention, polymerization (main polymerization) is carried out in the presence of the catalyst described above. Preferably, preliminary polymerization described below is carried out before the main polymerization.

In the preliminary polymerization, the solid titanium catalyst component (A) is usually employed in combination with at least a portion of the organoaluminum compound (B). This may be carried out in the presence of part or the whole of the organosilicon compound (C).

The concentration of the catalyst used in the preliminary polymerization may be much higher than that in the reaction system of the main polymerization.

Desirably, the concentration of the solid titanium catalyst component (A) in the preliminary polymerization is usually about 0.01 to 200 millimoles, preferably about 0.05 to 100 millimoles, calculated as titanium atoms per liter of an inert hydrocarbon medium to be described.

Preferably, the preliminary polymerization is carried out by adding an olefin and the above catalyst ingredients to an inert hydrocarbon medium and reacting the olefin under mild conditions.

Specific examples of the inert hydrocarbon medium used at this time are aliphatic hydrocarbons such as propane, butane, pentane, hexane, heptane, octane, decane, dodecane and kerosene; alicyclic hydrocarbons such as cyclopentane, cyclohexane and methylcyclopentane; aromatic hydrocarbons such as benzene, toluene and xylene; halogenated hydrocarbons such as ethylene chloride and chlorobenzene; and mixtures of these. The aliphatic hydrocarbons are preferred.

In the present invention, a liquid olefin may be used in place of part or the whole of the inert hydrocarbon medium.

The olefin used in the preliminary polymerization may be the same as, or different from, an olefin to be used in the main polymerization.

The reaction temperature for the preliminary polymerization may be one at which the resulting preliminary polymer does not substantially dissolve in the inert hydrocarbon medium. Desirably, it is usually about $-20°$ to $+100°$ C., preferably about $-20°$ to $+80°$ C., more preferably $0°$ to $+40°$ C.

A molecular-weight controlling agent such as hydrogen may be used in the preliminary polymerization. Desirably, the molecular weight controlling agent is used in such an amount that the polymer obtained by the preliminary polymerization has an intrinsic viscosity $[\eta]$, measured in decalin at $135°$ C., of at least about 0.2 dl/g, preferably about 0.5 to 10 dl/g.

The preliminary polymerization is desirably carried out so that about 0.1 to 1,000 g, preferably about 0.3 to 500 g, of a polymer forms per gram of the titanium catalyst component (A). If the amount of the polymer formed by the preliminary polymerization is too large, the efficiency of producing the olefin polymer in the main polymerization may sometimes decrease, and when the resulting olefin polymer is molded into a film or another article, fish eyes tend to occur in the molded article.

The preliminary polymerization may be carried out batchwise or continuously.

After the preliminary polymerization conducted as above or without performing any preliminary polymerization, the main polymerization of an olefin is carried out in the presence of the above-described olefin polymerization catalyst formed from the solid titanium catalyst component (A), the organoaluminum compound (B) and the organosilicon compound (C).

Examples of olefins that can be used in the main polymerization are alpha-olefins having 2 to 20 carbon atoms such as ethylene, propylene, 1-butene, 4-methyl-1-pentene, 1-octene, 1-hexene, 3-methyl-1-pentene, 3-methyl-1-butene, 1-decene, 1-tetradecene and 1-eicosine.

In the process of this invention, these alpha-olefins may be used singly or in combination.

In one embodiment of this invention, propylene or 1-butene is homopolymerized, or a mixed olefin containing propylene or 1-butene as a main component is copolymerized. When the mixed olefin is used, the proportion of propylene or 1-butene as the main component is usually at least 50 mole %, preferably at least 70 mole %.

When the catalyst subjected to the above preliminary polymerization is used in this embodiment, a polymer having excellent powder characteristics can be prepared from alpha-olefins having 2 to 10 carbon atoms, preferably 3 to 10 carbon atoms.

By performing the preliminanry polymerization, the catalyst in the main polymerization can be adjusted in the degree of activity. This adjustment tends to result in a powdery polymer having a high bulk density. Furthermore, when the preliminary polymerization is carried out, the particle shape of the resulting polymer becomes spherical, and in the case of slurry polymerization, the slurry attains excellent characteristics.

Furthermore, in this embodiment, a polymer having a high stereoregularity index can be produced with a high catalytic efficiency by polymerizing an alpha-olefin having at least 3 carbon atoms.

In the homopolymerization or copolymerization of these olefins, a polyunsaturated compound such as a conjugated diene or a non-conjugated diene may be used as a comonomer.

In the process of this invention, the main polymerization of an olefin is carried out usually in the gaseous or liquid phase.

When the main polymerization is carried out in a slurry reaction mode, the aforesaid inert hydrocarbon may be used as a reaction solvent. Alternatively, an olefin which is liquid at the reaction temperature may alternatively be used as the reaction solvent.

In the polymerization process of this invention, the titanium catalyst component (A) is used in an amount of usually about 0.001 to 0.5 millimole, preferably about 0.005 to 0.5 millimol, calculated as Ti atom per liter of the volume of the polymerization zone. The organoaluminum compound (B) is used in an amount of usually about 1 to 2,000 moles, preferably about 5 to 500 moles, per mole of titanium atoms in the taitanium catalyst component (A) in the polymerization system. Furthermore, the amount of the organosilicon compound (C) is usually about 0.001 to 10 moles, preferably about 0.01 to 2 moles, especially preferably about 0.01 to 2 moles, specially preferably about 0.05 to 1 moles, calculated as Si atoms in the organosilicon compound (C) per mol of the metal atoms in the organoaluminum compound (B).

The catalyst components (A), (B) and (C) may be contacted at the time of the main polymerization or during the preliminary polymerization before the main polymerization. In this contacting before the main polymerization, any desired two components may be selected and contacted with each other. Alternatively, only portions of two or three components may be contacted with each other.

In the process of this invention, the catalysts ingredients may be contacted before polymerization in an inert gas atmosphere, or in an olefin atmosphere.

When the organoaluminum compound (B) and the organosilicon compound (C) are used partially in the preliminary polymerization, the catalyst subjected to the preliminary polymerization is used together with the remainder of the catalyst components. The catalyst subjected to the preliminary polymerization may contain the preliminary polymerization product.

The use of hydrogen at the time of polymerization makes it possible to control the molecular weight of the resulting polymer, and the polymer obtained has a high melt flow rate. In this case, too, the stereoregularity index of the resulting polymer and the activity of the catalyst are not decreased in the process of this invention.

The polymerization temperature in this invention is usually about 20° to 200° C., preferably about 50° to 180° C., and the polymerization pressure is prescribed usually at atmospheric pressure to 100 kg/cm$^2$, preferably at about 2 to 50 kg/cm$^2$. The main polymerization may be carried out batchwise, semi-continuously or continuously. The polymerization may also be carried out in two or more stages under different reaction conditions.

The olefin polymer so obtained may be a homopolymer, a random copolymer or a block copolymer.

Since the yield of the stereoregular polymer obtained per unit amount of the solid titanium catalyst component in this invention is high, the amount of the catalyst residue in the polymer, particularly its halogen content can be relatively decreased. Accordingly, an operation of removing the catalyst from the resulting polymer can be omitted, and corrosion of a mold can be effectively prevented in molding the olefin polymer into articles.

Furthermore, the olefin polymer obtained by using the catalyst of this invention has a very small amount of an amorphous polymer component and therefore a small amount of a hydrocarbon-soluble component. Accordingly, a film molded from this polymer has low surface tackiness.

The polyolefin obtained by the process of this invention is excellent in particle size distribution, particle diameter and bulk density, and the copolyolefin obtained has a narrow composition distribution;

In another preferred embodiment of this invention, propylene and an alpha-olefin having 2 or 4–20 carbon atoms are copolymerized in the presence of the catalyst described above. The catalyst may be one subjected to the preliminary polymerization described above.

By performing the preliminary polymerization, the catalyst in the main polymerization can be adjusted in the degree of activity. This adjustment tends to result in a powdery polymer having a high bulk density. Furthermore, when the preliminary polymerization is carried out, the particle shape of the resulting polymer becomes spherical, and in the case of slurry polymerization, the slurry attains excellent characteristics. Accordingly, according to this embodiment of producing the propylene copolymer, the resulting copolymer powder or the copolymer slurry becomes easy to handle.

The alpha-olefin having 2 carbon atoms is ethylene, and examples of the alpha-olefins having 4 to 20 carbon atoms are 1-butene, 1-pentene, 4-methyl-1-pentene, 1-octen, 1-hexene, 3-methyl-1-pentene, 3-methyl-1-butene, 1-decene and 1-tetradecene.

In the main polymerization, propylene may be copolymerized with two or more such alpha-olefins. For example, it is possible to copolymerize propylene with ethylene and 1-butene. It is preferable in this invention to copolymerize propylene and ethylene, or propylene and 1-butene, or propylene, ethylene and 1-butene.

Block copolymerization of propylene and another alpha-olefin may be carried out in two stages. The polymerization in a first stage may be the homopolymerization of propylene or the copolymerization of propylene with the other alpha-olefin. Preferably, it is the copolymerization of propylene and ethylene, or propylene, ethylene and 1-butene. The amount of the monomers polymerized in the first stage is desirably about 50 to about 95% by weight, preferably about 60 to about 90% by weight, based on the final product. In the present invention, this first stage polymerization may, as required be carried out in two or more stages under the same or different polymerization conditions.

The polymerization in a second stage is desirably carried out such that the mole ratio of propylene to the other alpha-olefin is from 10/10 to 90/10, preferably from 20/80 to 80/20, especially preferably from 30/70 to 70/30. A step of producing a crystalline polymer or copolymer of another alpha-olefin may be provided in the second polymerization stage.

The propylene copolymer so obtained may be a random copolymer or the above-described block copolymer. This propylene copolymer preferably contains 7 to 50 mole % of units derived from the alpha-olefin having 2 or 4–20 carbon atoms. In particular, propylene random copolymer contains 7 to 20 mole %, preferably 7 to 18 mole %, more preferably 8 to 15 mole %, of units derived from the alpha-olefin having 2 or 4–20 carbon atoms. Desirably, the propylene block copolymer contains 10 to 50 mole %, 20 to 50 mole %, more preferably 25 to 45 mole %, of units derived from the alpha-olefin having 2 or 4–20 carbon atoms.

The resulting propylene copolymer has a tensile strength of usually not more than 8,000 kg/cm$^2$, preferably 6,000 kg/cm$^2$.

The melting point of the propylene random copolymer, measured by a differential scanning calorimeter (to be abbreviated as the DSC melting point) is 90° to 130° C., preferably 95° to 125° C., especially preferably 100° to 120° C. In the melting point measurement, a differential scanning calorimeter (DSC-7 made by Perkin Elmer Co.) is used, and a press sheet having a thickness of 0.1 mm left to stand for 20 hours after molding is heated once to 200° C., and cooled to 25° C. at a rate of 10° C./min., and subjected to calorimetry from 25° to 200° C. at a temperature elevating rate of 10° C./min. The temperature Tm at which a maximum endothermic peak is obtained is defined as the DSC melting point.

The propylene block copolymer contains 20 to 70% by weight, preferably 30 to 60% by weight, especially preferably 40 to 60% by weight, of a portion soluble in n-decane solvent at 23° C.

The amount of this soluble portion is measured by the following method. A 1-liter flask equipped with an agitating vane is filled with 3 g of a copolymer sample, 20 mg of 2,6-di-tert-butyl-4-methylphenol and 500 ml of decane and the copolymer is dissolved over an oil bath at 145° C. The solution is then allowed to cool spontaneously for about 8 hours at room temperature. Then, it is allowed to stand for 20 hours over an oil bath at 23° C. The precipitated copolymer is separated by filtration from the n-decane solution containing the dissolved copolymer by a glass filter (G-4). The resulting solution is dried at 150° C. under 10 mmHg to a constant weight, and its weight is measured. The amount of the soluble portion of the copolymer in the solution is divided by the weight of the copolymer sample and expressed in %.

It should be understood that where there is no reference to the polyunsaturated compound that can be used, the method of polymerization, the amount of the catalyst and the polymerization conditions, the same description as the above embodiments shall be applicable.

According to this invention, a polypropylene copolymer such as a polypropylene random copolymer having a low melting point can be obtained in a large amount and a high yield. In addition, the amount of the by-product hydrocarbon-soluble copolymer can be reduced. The polymerization can be carried out without any trouble even in suspension. Since the amount of the copolymer yielded per unit amount of titanium is large, an operation of removing the catalyst after the polymerization can be omitted.

The propylene random copolymer obtained by this invention has excellent heat sealability, heat seal imparting property, transparency and antiblocking property and contains a small amount of a portion soluble in a hydrocarbon. Accordingly, it is suitable in the field of films, particularly packaging film (shrinkable films) such as food packaging films.

The present invention can produce a propylene block copolymer having excellent melt-flowability, moldability, rigidity, impact strength and impact strength with a high catalytic efficiency and good operability.

The following Examples illustrate the present invention more specifically without any intention of limiting the invention thereby.

EXAMPLE 1

Preparation of a Solid Titanium Catalyst Component (A)

Anhydrous magnesium chloride (7.14 g; 75 millimoles), 37.5 ml of decane and 35.1 ml (225 millimoles) of 2-ethylhexyl alcohol were heated at 130° C. for 2 hours to form a uniform solution. Phthalic anhydride (1.67 g; 11.3 millimoles) was added to the solution, and they were mixed with stirring at 130° C. for 1 hour to dissolve the phthalic anhydride in the uniform solution.

The uniform solution so obtained was cooled to room temperature, and added dropwise to 200 ml (1.8 moles) of titanium tetrachloride kept at $-20°$ C. over the course of 1 hour. After the addition, the temperature of the solution was raised to 110° C. over 4 hours, and when reached 110° C., 5.03 ml (L8.8 millimoles) of diisobutyl phthalate was added.

The mixture was stirred further for 2 hours at the above temperature. After the end of the 2-hour reaction, the solid portion was collected by hot filtration, and 275 ml of the solid portion was resuspended in $TiCl_4$ and reacted at 110° C. for 2 hours.

After the reaction, the solid portion was again collected by hot filtration, and washed with decane at 110° C. and hexane at room temperature until no titanium compound was detected in the washings.

A solid titanium catalyst component (A) was obtained as a hexane slurry. Part of the catalyst was taken and dried. Analysis of the dried product showed it to contain 2.5% by weight of titanium, 58% by weight of chlorine, 18% by weight of magnesium and 13.8% by weight of diisobutyl phthalate.

Preliminary Polymerization

Purified hexane (200 ml) was put in a 500 ml nitrogen-purged glass reactor, and 20 millimoles of triethyl aluminum, 4 millimoles of dicyclopentyldimethyoxysilane and 2 millimoles, as Ti, of the titanium catalyst component (A) were added. Propylene was fed into the flask at a rate of 5.9 Nl/hour for 1 hour to polymerize 2.8 g of propylene per gram of the Ti catalyst component (A).

After the preliminary polymerization, the liquid portion was removed by filtration, and the separated solid portion was again dispersed in decane.

Main Polymerization

A 2-liter autoclave was charged with 500 g of propylene, and at 60° C., 0.6 millimole of triethylaluminum, 0.06 millimole, calculated as titanium atoms, of the solid titanium catalyst component (A) subjected to the preliminary polymerization. Hydrogen (1 liter) was further added, and the temperature was elevated to 70° C. Propylene was thus polymerized for 40 minutes.

The polymer formed was dried, and weighed. The total amount of the polymer yielded was 279 g.

The polymer had a boiling n-heptane extraction residue of 99.2% and an MFR of 6.3 g/10 min. Hence, the polymerization activity at this time was 46,500 g-PP/millimole of Ti.

The polymerization of the catalyst used, and the boiling n-heptane extraction residue, MFR and apparent density of the resulting polypropylene are shown in Table 1.

EXAMPLE 2

Example 1 was repeated except that in the preliminary polymerization, the amount of triethyl aluminum was changed to 6 millimoles and dicyclopentyldimethoxysilane was not added.

The polymerization activity of the catalyst used and the boiling n-heptane extraction residue, MFR and apparent density of polypropylene obtained are shown in Table 1.

EXAMPLE 3

Preparation of a Solid Titanium Catalyst Component (A)

The inside of a high-speed stirring device (made by Tokushu Kika Kogyo K.K.) having an inner capacity of 2 liters was thoroughly purged with nitrogen, and charged with 700 ml of purified kerosene, 10 g of commercial $MgCl_2$, 24.2 g of ethanol and 3 g of sorbitan distearate (Emasol 320, a tradename for a product of Kao-Atlas Co., Ltd.). The system was heated with stirring, and stirred at 120° C. and 800 rpm for 30 minutes.

Separately, a 2-liter glass flask equipped with a stirrer was charged with 1 liter of purified kerosene, and cooled to −20° C.

The purified kerosene containing MgCl₂ was transferred to 1 liter of the purified kerosene cooled to −10° C. by using a 5 mm Teflon tube.

The resulting solid was collected by filtration and thoroughly washed with hexane to produce a carrier.

The resulting carrier (7.5 g) was suspended in 150 ml of titanium tetrachloride, and 1.3 ml of diisobutyl phthalate was added. The temperature was elevated to 120° C. The mixture was stirred at 120° C. for 2 hours, and the solid portion was collected by filtration it was again suspended in 150 ml of titanium tetrachloride and stirred at 130° C. for 2 hours.

The solid reaction product was collected by filtration, and washed with a sufficient amount of purified hexane to give a solid titanium catalyst component (A).

The solid titanium catalyst component (A) was found to contain 2.2% weight of titanium, 63% by weight of chlorine, 20% by weight of magnesium and 5.0% by weight of diisobutyl phthalate.

Preliminary Polymerization

A 400 ml nitrogen-purged glass reactor was charged with 200 ml of purified hexane, and 20 millimoles of triethyl aluminum, 4 millimoles of dicyclopentyldimethoxysilane and 2 millimoles, calculated as titanium atoms, of the solid titanium catalyst component (A) were put in the flask. Then, propylene was fed at a rate of 5.9 Nl/hour for 1 hour to polymerize 2.8 g of propylene per gram of the solid titanium catalyst component (A).

After the preliminary polymerization, the liquid portion was removed by filtration, and the solid portion collected by filtration was again dispersed in decane.

Main Polymerization

Propylene was polymerized as in Example 1 except that the solid titanium catalyst component (A) subjected to the preliminary polymerization was used instead of the one used in Example 1.

The polymerization activity of the catalyst used and the boiling n-heptane extraction residue, MFR and apparent density of the resulting polypropylene are shown in Table 1.

EXAMPLE 4

Example 3 was repeated except that bis(2-methylcyclopentyl)dimethoxysilane was used instead of dicyclopentyldimethoxysilane.

The polymerization activity of the catalyst used and the boiling n-heptane extraction residue, MFR and apparent density of the resulting polypropylene are shown in Table 1.

EXAMPLE 5

Example 1 was repeated except that di-2,4-cyclopentadienyldimethoxysilane was used instead of dicyclopentyldimethoxysilane.

The polymerization activity of the catalyst used and the boiling n-heptane extraction residue, MFR and apparent density of the resulting polypropylene are shown in Table 1.

TABLE 1

| Example | Polymerization activity | II (%) | MFR | Apparent density |
|---|---|---|---|---|
| 1 | 46,500 | 99.2 | 6.3 | 0.46 |
| 2 | 45,100 | 98.9 | 6.0 | 0.46 |
| 3 | 45,800 | 98.9 | 6.0 | 0.46 |
| 4 | 33,300 | 94.3 | 5.7 | 0.45 |
| 5 | 42,600 | 95.2 | 6.2 | 0.43 |

EXAMPLE 6

Main Polymerization

A 2-liter autoclave was charged with 500 g of propylene, and at 60° C., 0.6 millimole of triethyl aluminum, 0.06 millimole of dicyclopentyldimethoxysilane and 0.006 millimole, calculated as titanium atoms, of the catalyst component (A) subjected to the preliminary polymerization in Example 3 were added. Hydrogen (1 liter) was introduced into the flask, and the temperature was elevated to 70° C. Propylene as thus polymerized for 40 minutes. The total amount of the polymer dried was 345 g. The polymer had a boiling n-heptane extraction residue of 98.7%, an MFR of 1.0 g/10 min., and an apparent density of 0.47 g/ml.

Accordingly, the polymerization activity at this time was 57,500 g-PP/millimole-Ti.

EXAMPLE 7

Example 6 was repeated except that di-2,4-cyclopentadienyldimethoxysilane was used instead of dicyclopentyldimethoxysilane.

The polymerization activity of the catalyst and the boiling n-heptane extraction residue, MFR and apparent density of the resulting polypropylene are shown in Table 2.

TABLE 2

| Example | Polymerization activity | II (%) | MFR | Apparent density |
|---|---|---|---|---|
| 6 | 57,500 | 98.7 | 1.0 | 0.47 |
| 7 | 53,700 | 98.9 | 1.2 | 0.46 |

EXAMPLE 8

Main Polymerization

Sodium chloride (special grade made by Wako Pure Chemicals, Co., Ltd.) was introduced into a 2-liter thoroughly nitrogen-purged stainless steel autoclave, and dried under reduced pressure at 90° C. for 1 hour. The reaction system was then cooled to 65° C., and a mixture of 1 millimole of triethyl aluminum, 0.1 millimole of dicyclopentyldimethoxysilane and 0.01 millimol, calculated as titanium atoms, of the solid titanium catalyst component (A) subjected to the preliminary polymerization was added. Hydrogen (150 Nml) was then introduced, and feeding of a gaseous mixture of propylene and ethylene (in a mole ration of 93.1/6.9) was started. The total pressure was maintained at 5 kg/cm²-G, and the monomers were polymerized at 70° C. for 1 hour. After the polymerization, sodium chloride was removed by washing with water, and the remaining polymer was washed with methanol and dried overnight at 80° C.

The polymerization activity of the catalyst used and the MFR, ethylene content, DSC melting point and n-decane-soluble content of the resulting polymer in Table 3.

EXAMPLE 9

Example 8 was repeated except that bis(2-methylcyclopentyl)dimethoxysilane was used instead of dicyclopentyldimethoxysilane.

The polymerization activity of the catalyst used and the MFR, ethylene content, DSC melting point and n-decane-soluble content of the resulting polymer are shown in Table 3.

TABLE 3

| Example | Polymerization activity | MFR | Ethylene content | Tm | Decane-soluble content |
|---|---|---|---|---|---|
| 8 | 8,500 | 1.3 | 6.1 | 133.0 | 4.9 |
| 9 | 7,200 | 1.4 | 6.2 | 133.2 | 6.2 |

EXAMPLE 10

Example 8 was repeated except that a gaseous mixture composed of propylene, ethylene and 1-butene (74.8/8.8/7.8 by mole) was used instead of the gaseous mixture used in Example 8.

The catalyst used had a polymerization activity of 7400 g-PP/millimole-Ti. The resulting polymer had an MFR of 3.3 g/10 min., an apparent density of 0.34 g/ml, an ethylene content of 5.3 mole %, a butene content of 6.2 mole %, a tensile strength of 2300 kg/cm², a DSC melting point of 103° C. and an n-decane-soluble content of 42% by weight.

EXAMPLE 11

Example 10 was repeated except that a gaseous mixture composed of propylene, ethylene and butene-1 (88.5/5.3/6.2 by mole) was used instead of the gaseous monomeric mixture used in Example 10.

The catalyst used had a polymerization activity of 6400 g-PP/millimole-Ti. The resulting polymer had an MFR of 2.5 g/10 min., an apparent bulk density of 0.38 g/ml, an ethylene content of 2.8 mole %, a butene content of 6.4 mole %, a tensile strength of 4600 kg/cm², a DSC melting point of 121.1° C. and an n-decane-soluble content of 8.2% by weight.

EXAMPLE 12

A 17-liter polymerization reactor was charged at room temperature with 2.5 kg of propylene and 9N liters of hydrogen, and then the temperature was elevated. At 50° C., 15 millimoles of triethyl aluminum, 1.5 millimoles of dicyclopentyldimethoxysilane and 0.05 millimoles, calculated as titanium atoms, of the catalyst component (A) subjected to the preliminary polymerization in Example 3 were added. The temperature of the inside of the reactor was maintained at 70° C. Ten minutes after the temperature reached 70° C., the vent valve was opened to purge propylene until the inside of the reactor was maintained at atmospheric pressure. After purging, the copolymerization was carried out. Specifically, ethylene, propylene and hydrogen were fed into the polymerization reactor at a rate of 380 Nl/hour, 720 Nl/hour, and 12 Nl/hour, respectively.

The extend of opening the vent of the reactor was adjusted so that the pressure of the inside of the reactor reached 10 kg/cm²-G. During the copolymerization, the temperature was maintained at 70° C. After the lapse of 85 minutes, the pressure was released. There was obtained 2.8 kg of a polymer. The polymer had an MFR at 230° C. under a load of 2 kg of 1.8 g/10 min., an ethylene content of 29 mole %, an apparent bulk density of 0.43/cm³ a tensile strength of 3600 kg/cm², an n-decane-soluble content at 23° C. of 41% by weight. The soluble component of the copolymer had an ethylene content of 43 mole %.

We claim:

1. An olefin polymerization catalyst formed from
 (A) a solid titanium component which contains magnesium, titanium, halogen and an electron donor as the essential components prepared by contacting of a magnesium compound with a titanium compound and an electron donor, said magnesium compound having been for a time in a liquid condition during preparation of said solid titanium component;
 (B) an organoaluminum compound; and
 (C) an organosilicon compound represented by the following formula

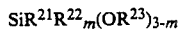

SiR²¹R²²$_m$(OR²³)$_{3-m}$ wherein R²¹ represents a cyclopentyl group, a cyclopentyl group substituted by 1 to 4 alkyl groups having 1 to 4 carbon atoms, an alkyl group having 2 to 4 carbon atoms substituted by a cyclopentyl group or a cyclopentyl group substituted by 1 to 4 alkyl groups having 1 to 4 carbon atoms, a cyclopentenyl group, a cyclopentenyl group substituted by 1 to 4 alkyl groups having 1 to 4 carbon atoms, a cyclopentadienyl group, a cyclopentadienyl group substituted by 1 to 4 alkyl groups having 1 to 4 atoms, an indenyl group, an indenyl group substituted by 1 to 4 alkyl groups having 1 to 4 carbon atoms, an indanyl group, an indanyl group substituted by 1 to 4 alkyl groups having 1 to 4 carbon atoms, a tetrahydroindenyl group, a tetrahydroindenyl group substituted by 1 to 4 alkyl groups having 1 to 4 carbon atoms, a fluorenyl group or a fluorenyl group substituted by 1 to 4 alkyl groups having 1 to 4 carbon atoms;

R²² and R²³ are identical or different and each represents a hydrocarbon group; and $0 \leq m < 3$.

2. The catalyst of claim 1 in which the solid titanium catalyst component (A) is obtained by using a titanium compound of the following formula

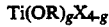

Ti(OR)$_g$X$_{4-g}$ wherein R represents a hydrocarbon group, X represents a halogen atom and g is a number of 0 to 4.

3. The catalyst of claim 1 in which the organoaluminum compound (B) is an organoaluminum compound having at least one aluminum-carbon bond in the molecule.

* * * * *

UNITED STATES PATENT AND TRADEMARK OFFICE
CERTIFICATE OF CORRECTION

PATENT NO. : 4,990,479
DATED : February 5, 1991
INVENTOR(S) : NAOSHI ISHIMARU, ET AL.

It is certified that error appears in the above-identified patent and that said Letters Patent is hereby corrected as shown below:

ON THE TITLE PAGE

At [30] Foreign Application Priority Data "1-149503" should read -- 63-149503 -- and "63-50871" should read -- 1-50871 --.

Signed and Sealed this

Twentieth Day of July, 1993

Attest:

MICHAEL K. KIRK

Attesting Officer

Acting Commissioner of Patents and Trademarks